United States Patent
Kanai

(10) Patent No.: US 11,215,505 B2
(45) Date of Patent: Jan. 4, 2022

(54) CALIBRATION APPARATUS, CALIBRATION METHOD, SPECTRAL CAMERA, AND DISPLAY APPARATUS

(71) Applicant: Seiko Epson Corporation, Tokyo (JP)

(72) Inventor: Masashi Kanai, Azumino (JP)

(73) Assignee: Seiko Epson Corporation

( * ) Notice: Subject to any disclaimer, the term of this patent is extended or adjusted under 35 U.S.C. 154(b) by 78 days.

(21) Appl. No.: 16/848,915

(22) Filed: Apr. 15, 2020

(65) Prior Publication Data
US 2020/0333184 A1 Oct. 22, 2020

(30) Foreign Application Priority Data
Apr. 16, 2019 (JP) .............................. JP2019-077970

(51) Int. Cl.
G01J 3/30 (2006.01)
G01J 3/02 (2006.01)
G01J 3/28 (2006.01)

(52) U.S. Cl.
CPC ........... *G01J 3/0297* (2013.01); *G01J 3/0254* (2013.01); *G01J 3/2823* (2013.01); *G01J 3/30* (2013.01)

(58) Field of Classification Search
CPC .......... G01J 3/0297; G01J 3/0254; G01J 3/28; G01J 2003/2879
See application file for complete search history.

(56) References Cited

U.S. PATENT DOCUMENTS

| 9,041,928 B2 * | 5/2015 | Kanai ................. G01N 21/251 356/402 |
| 2003/0011767 A1* | 1/2003 | Imura ...................... G01J 3/10 356/326 |
| 2016/0131524 A1* | 5/2016 | Arenhold .............. G01J 3/0297 356/405 |
| 2017/0122807 A1 | 5/2017 | Kasahara et al. |
| 2018/0202863 A1* | 7/2018 | Hung ....................... G01J 3/28 |

FOREIGN PATENT DOCUMENTS

JP  2017-083314 A  5/2017

* cited by examiner

*Primary Examiner* — Maurice C Smith
(74) *Attorney, Agent, or Firm* — Harness, Dickey & Pierce, P.L.C.

(57) ABSTRACT

There is provided a calibration apparatus including one or a plurality of first processors programmed to: obtain spectrum images from a spectral camera that images light from alight source portion; obtain a spectral reference value from a measurement result of a calibration reference device that measures the light; extract a gradation value at a correction point that is a pixel which generates a correction matrix among the spectrum images as a measurement value; divide the measurement value at the correction point and the spectral reference value by a luminance value of the light emitted from the light source portion to obtain a normalized measurement value and a normalized reference value; and calculate the correction matrix based on the normalized measurement value and the normalized reference value.

12 Claims, 8 Drawing Sheets

CALIBRATION APPARATUS, CALIBRATION METHOD, SPECTRAL CAMERA, AND DISPLAY APPARATUS

The present application is based on, and claims priority from JP Application Serial Number 2019-077970, filed Apr. 16, 2019, the disclosure of which is hereby incorporated by reference herein in its entirety.

BACKGROUND

1. Technical Field

The present disclosure relates to a calibration apparatus, a calibration method, a spectral camera, and a display apparatus.

2. Related Art

In the related art, there is known a calibration apparatus which calculates a correction matrix for correcting wavelength unevenness of a spectrum image captured by a spectral camera (for example, see JP-A-2017-83314).

In the apparatus disclosed in JP-A-2017-83314, light emitted from a light source and reflected by a white reference plate is imaged by the spectral camera and white reference data for each wavelength is obtained. In addition, a dark value is obtained by blocking incident light onto the spectral camera. Further, light emitted from the light source and reflected by a reference plate having known reflectance is imaged by the spectral camera and a measurement value at each pixel for each wavelength is obtained. The reference plates having a plurality of colors are prepared so as to respectively obtain spectrum images for the reference plates having the plurality of colors.

A reflectance is calculated by dividing a value obtained by subtracting a dark value from the measurement value by a value obtained by subtracting the dark value from white reference data, and a correction matrix for correcting wavelength unevenness is calculated by using the reflectance and the known reflectance. Therefore, it is possible to calculate a correction matrix for suppressing effects of uneven illumination and shading of the light source.

Meanwhile, in the calibration apparatus and the calibration method in JP-A-2017-83314, the light amount of the light source is fixed and each matrix element of the correction matrix is calculated from the reflectance of each wavelength by using a least-squares method, so that approximately the same conversion errors occur regardless of brightness of the light source. In this case, there is a problem that chromaticity after color conversion tends to deteriorate when a measurement target is dark.

SUMMARY

A calibration apparatus according to a first application example includes one or a plurality of first processors programmed to: obtain spectrum images from a spectral camera that images light from a light source portion; obtain a spectral reference value from a measurement result of a calibration reference device that measures the light; extract a gradation value at a correction point that is a pixel which generates a correction matrix among the spectrum images as a measurement value; divide the measurement value at the correction point and the spectral reference value by a luminance value of the light emitted from the light source portion to obtain a normalized measurement value and a normalized reference value; and calculate the correction matrix based on the normalized measurement value and the normalized reference value.

In the calibration apparatus according to the first application example, the light source portion may include a display apparatus that outputs image light and an integrating sphere that uniformizes the image light and emits the light.

In the calibration apparatus according to the first application example, the light source portion may cause the display apparatus to output the image light of a plurality of single colors including black and a plurality of low-gradation colors, and the one or the plurality of first processors may be further programmed to: divide a value obtained by subtracting the measurement value at the correction point for the image light of black from the measurement value at the correction point for the image light of a single color other than the black, by the luminance value of the image light and set the resultant value as the normalized measurement value; divide a value obtained by subtracting the spectral reference value for the image light of the black from the spectral reference value for the image light of the single color other than the black, by the luminance value of the image light and set the resultant value as the normalized reference value; divide the measurement value at the correction point for the image light of the black and the plurality of low-gradation colors, by the luminance value of the image light and set the resultant value as a black color normalized measurement value; divide the spectral reference value for the image light of the black and the low-gradation color, by the luminance value of the image light and set the resultant value as a black color normalized reference value; and calculate a normal correction matrix based on the normalized measurement value and the normalized reference value, and calculate a black color correction matrix based on the black color normalized measurement value and the black color normalized reference value.

In the calibration apparatus according to the first application example, the one or the plurality of first processors may be further programmed to: perform exposure correction on the gradation value by dividing the gradation value of the spectrum image by an exposure time when the light is measured by the spectral camera.

In the calibration apparatus according to the first application example, the one or the plurality of first processors may be further programmed to: evaluate correction accuracy of the calculated correction matrix.

In the calibration apparatus according to the first application example, the one or the plurality of first processors may be further programmed to: generate a plurality of pieces of learning data in which at least one of a position of the correction point, the number of the correction points, a target wavelength for extracting the measurement value at the correction point, and the number of the target wavelengths is changed; calculate the correction matrix for each of the plurality of pieces of learning data; and evaluate the correction matrix for each piece of learning data and adopt the correction matrix having highest evaluation.

In the calibration apparatus according to the first application example, the one or the plurality of first processors may be further programmed to: generate new learning data by changing at least one of the position of the correction point, the number of the correction points, the target wavelength, and the number of the target wavelengths, of the learning data corresponding to the correction matrix evaluated to have highest evaluation; and adopt the correction matrix based on the new learning data when an evaluation difference between the correction matrix based on the new learning data and the correction matrix based on the previous learning data is equal to or less than a predetermined threshold value.

A method according to a second application example is performed by one or a plurality of processors, the method including: obtaining spectrum images from a spectral camera that images light from a light source portion; obtaining a spectral reference value from a measurement result of a calibration reference device that measures the light; extracting a gradation value at a correction point that is a pixel which generates a correction matrix among the spectrum images as a measurement value; dividing the measurement value at the correction point and the spectral reference value by a luminance value of the light emitted from the light source portion to obtain a normalized measurement value and a normalized reference value; and calculating the correction matrix based on the normalized measurement value and the normalized reference value.

A spectral camera according to a third application example includes: a memory in which the correction matrix calculated by the calibration apparatus according to the first application example is recorded; and one or a plurality of second processors programmed to correct a color at a predetermined position in the spectrum image by using the correction matrix.

In the spectral camera according to the third application example, the one or the plurality of second processors may be further programmed to: obtain coordinates of a measurement point from a display apparatus and interpolate the correction matrix at the measurement point from the correction matrices for a plurality of the correction points.

A display apparatus according to a fourth application example is communicably coupled to the spectral camera according to the third application example and outputs image light as the light, and the apparatus includes one or a plurality of third processors programmed to: transmit a position of a predetermined measurement point in the spectrum image to the spectral camera to command execution of colorimetry; and receive a colorimetry result at the measurement point from the spectral camera and correct the image light based on the colorimetry result.

A non-transitory computer-readable storage medium according to a fifth application example stores an instruction for causing one or a plurality of processors to execute a method, the method including: obtaining spectrum images from a spectral camera that images light from a light source portion; obtaining a spectral reference value from a measurement result of a calibration reference device that measures the light; extracting a gradation value at a correction point that is a pixel which generates a correction matrix among the spectrum images as a measurement value; dividing the measurement value at the correction point and the spectral reference value by a luminance value of the light emitted from the light source portion to obtain a normalized measurement value and a normalized reference value; and calculating the correction matrix based on the normalized measurement value and the normalized reference value.

DESCRIPTION OF EXEMPLARY EMBODIMENTS

First Embodiment

Hereinafter, a first embodiment will be described.

Figure 1:
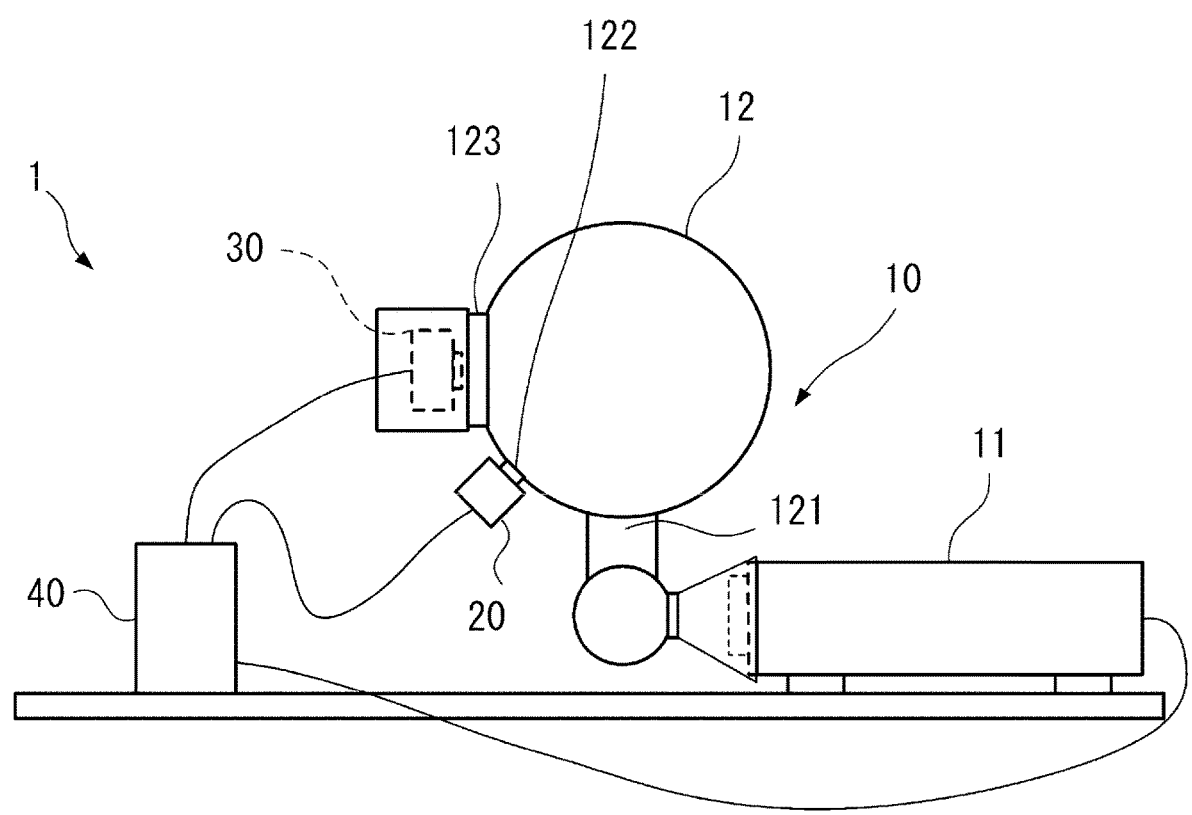
FIG. 1 is a schematic diagram illustrating a schematic configuration of a calibration system according to a first embodiment.
Figure 2:
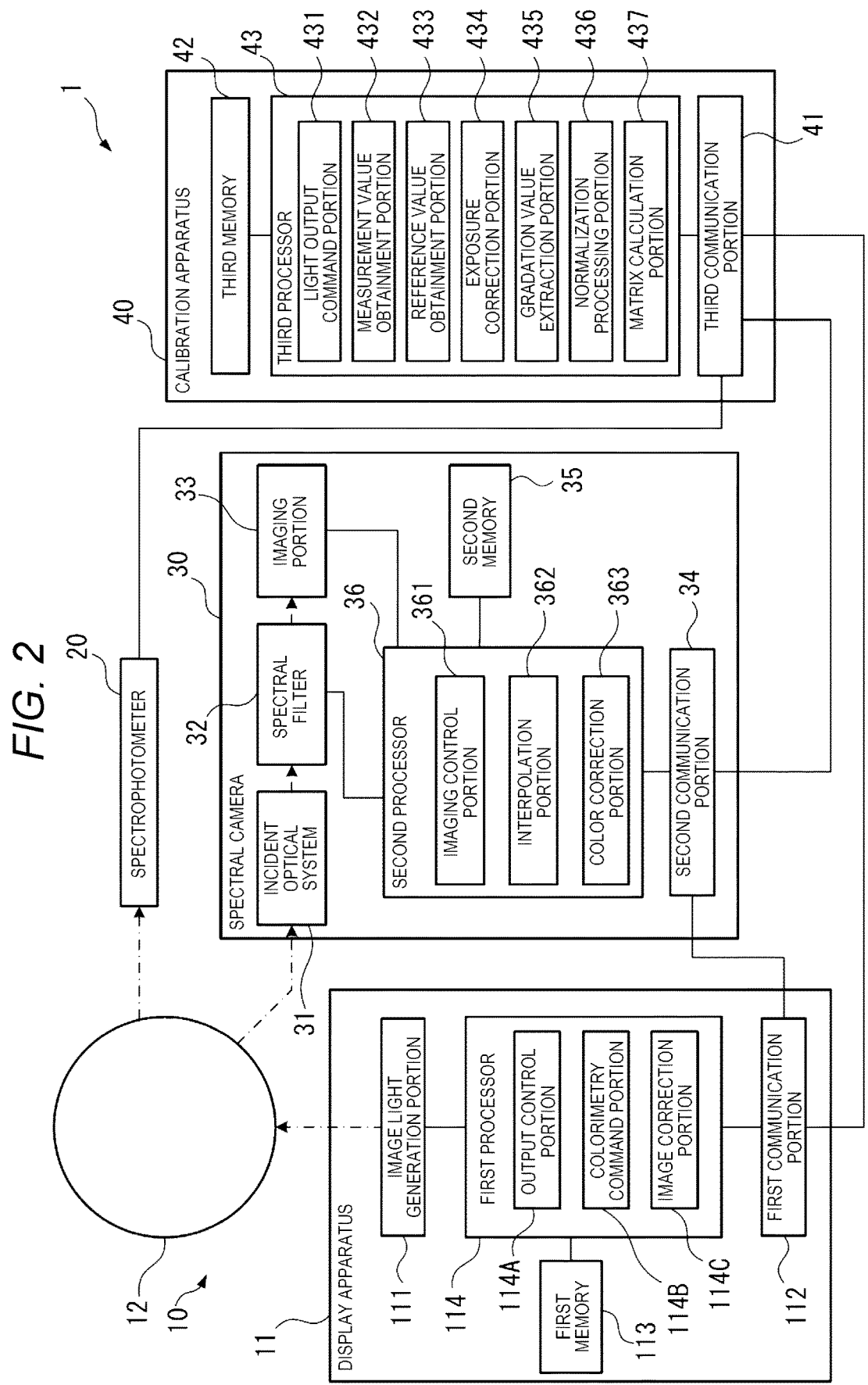
FIG. 2 is a block diagram illustrating the calibration system according to the first embodiment.

FIG. 1 is a diagram illustrating a schematic configuration of a calibration system 1 according to the first embodiment. FIG. 2 is a block diagram of the calibration system 1.

As illustrated in FIGS. 1 and 2, the calibration system 1 includes a light source portion 10, a spectrophotometer 20 which is a calibration reference device, a spectral camera 30 which is a calibration target, and a calibration apparatus 40.
Configuration of Light Source Portion 10

The light source portion 10 includes a display apparatus 11 and an integrating sphere 12.

The display apparatus 11 is an apparatus which outputs image light. The display apparatus 11 is configured to include a projector, for example.

As illustrated in FIG. 2, the display apparatus 11 includes an image light generation portion 111, a communication portion 112, a memory 113, and a processor 114.

In the following description, in order to distinguish the communication portion 112 of the display apparatus 11, the communication portion 34 of the spectral camera 30, and the communication portion 41 of the calibration apparatus 40, the communication portion 112 of the display apparatus 11 is referred to as the first communication portion 112. In addition, the communication portion 34 of the spectral camera 30 is referred to as the second communication portion 34, and the communication portion 41 of the calibration apparatus 40 is referred to as the third communication portion 41.

Further, in order to distinguish the memory 113 of the display apparatus 11, a memory 35 of the spectral camera 30, and a memory 42 of the calibration apparatus 40, the memory 113 of the display apparatus 11 is referred to as the first memory 113. In addition, the memory 35 of the spectral camera 30 is referred to as the second memory 35, and the memory 42 of the calibration apparatus 40 is referred to as the third memory 42.

Further, in order to distinguish the processor 114 of the display apparatus 11, a processor 36 of the spectral camera 30, and a processor 43 of the calibration apparatus 40, the processor 114 of the display apparatus 11 is referred to as the first processor 114. In addition, the processor 36 of the spectral camera 30 is referred to as the second processor 36, and the processor 43 of the calibration apparatus 40 is referred to as the third processor 43.

The image light generation portion 111 is configured to include, for example, a light source, a light separation element, a liquid crystal panel, a light synthesis element, a projection optical system, and the like.

The light source is configured with a halogen lamp or the like, and outputs light for generating image light.

The light separation element separates light output from the light source into light beams of R (red), G (green), and B (blue).

The liquid crystal panel is provided on an optical path of each color of R, G, and B. This liquid crystal panel is an optical element having a plurality of pixels and is configured to change light transmittance for each pixel, and changes the light transmittance of each pixel based on control of the first processor 114.

The light synthesis element combines light beams of respective colors passed through the liquid crystal panel so as to form image light.

The projection optical system is configured to include a projection lens and the like, and emits the image light to the outside.

The first communication portion 112 can communicate with external devices such as the spectral camera 30 and the calibration apparatus 40. A communication method by the first communication portion 112 is not particularly limited thereto. For example, the communication method may be a method of being coupled to the external device by wire or may be a method of performing communication with the external device by wireless communication.

The first memory 113 records various programs and various information for controlling the display apparatus 11. As various information, a reference image output when a calibration process is performed on the spectral camera 30 in the calibration system 1, a drive parameter of a light source or a liquid crystal panel for image information input from the external device, and the like are recorded.

The first processor 114 functions as an output control portion 114A, a colorimetry command portion 114B, an image correction portion 114C, or the like by reading and executing various programs stored in the first memory 113.

The output control portion 114A controls the image light generation portion 111 so as to generate image light corresponding to the image information input from the external device and the reference image stored in the memory. At this time, the output control portion 114A generates the image light in accordance with the drive parameter stored in the memory.

When the image light is projected from the image light generation portion 111 onto a projection target, the colorimetry command portion 114B transmits an imaging command of a spectrum image and a position of a measurement point to the spectral camera 30. Therefore, the image light projected by the spectral camera 30 is imaged, and a color conversion process is performed on the measurement point in the spectral camera. The colorimetry command portion 114B receives a colorimetry result for each measurement point on which the color conversion process is performed, from the spectral camera.

The image correction portion 114C receives the colorimetry result at the measurement point from the spectral camera 30, and corrects a drive parameter for driving the image light generation portion 111 based on the received colorimetry result.

The integrating sphere 12 is an optical member having a spherical reflecting surface on the inner surface, and includes an entrance window 121, a first exit window 122, and a second exit window 123. The display apparatus 11 is coupled to the entrance window 121, and light output from the display apparatus 11 is incident through the entrance window 121. The spectrophotometer 20 is coupled to the first exit window 122, and the spectral camera 30 is coupled to the second exit window 123.

The integrating sphere 12 mixes image light beams incident from the display apparatus 11 by reflecting the image light by the reflecting surface, and the light amount becomes uniform in the surface. The uniformized image light is emitted from the first exit window 122 to the spectrophotometer 20 and is emitted from the second exit window 123 to the spectral camera 30.

Configuration of Spectrophotometer 20

The spectrophotometer 20 receives image light output from the integrating sphere 12, and executes spectral measurement on the image light. The spectrophotometer 20 is a calibration reference device, and is a device which performs accurate spectrum measurement on incident light.

In the present embodiment, the spectrophotometer 20 outputs a tristimulus value of the incident light as a spectral measurement result.

Configuration of Spectral Camera 30

The spectral camera 30 is a spectroscope to be calibrated by the calibration system 1, receives image light output from the integrating sphere 12, and captures spectrum images for a plurality of wavelengths.

As illustrated in FIG. 2, the spectral camera 30 includes an incident optical system 31, a spectral filter 32, an imaging portion 33, the second communication portion 34, the second memory 35, and the second processor 36.

The incident optical system 31 includes a plurality of lenses on which image light is incident, and guides the incident image light to the spectral filter 32 and the imaging portion 33.

The spectral filter 32 is a spectral element which makes light having a predetermined wavelength from the incident image light pass.

Figure 3:
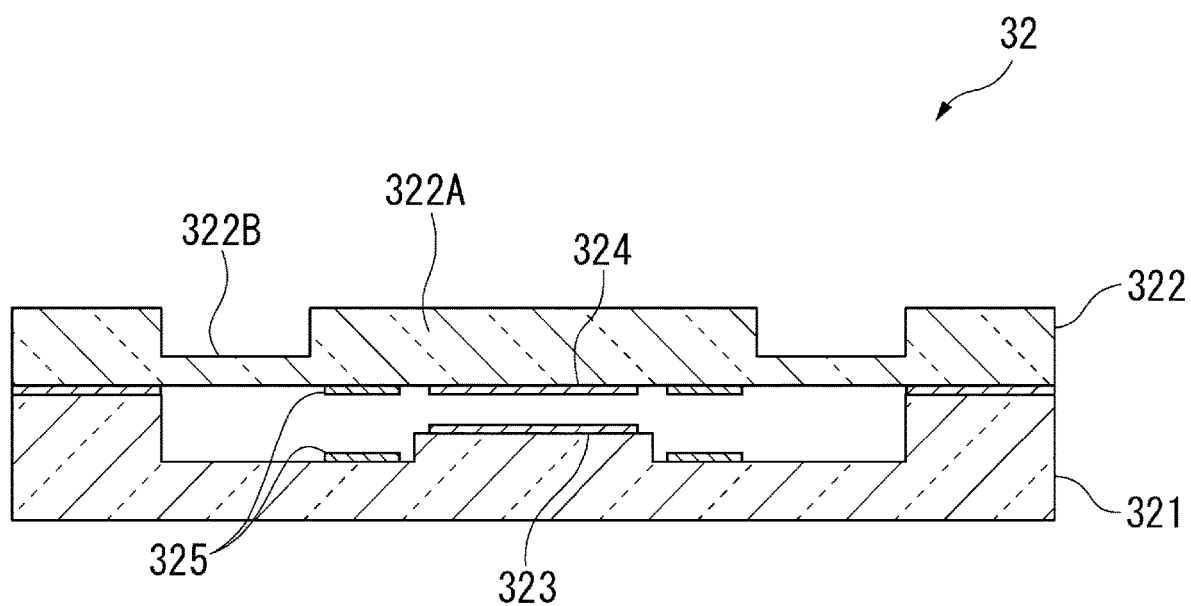
FIG. 3 is a diagram illustrating an example of a spectral filter according to the first embodiment.

FIG. 3 is a diagram illustrating an example of the spectral filter 32.

In the present embodiment, as the spectral filter 32, a variable wavelength Fabry-Perot etalon including a first substrate 321, a second substrate 322, a first reflecting film 323 provided on the first substrate 321, a second reflecting film 324 provided on the second substrate 322, and a gap change portion 325 is used.

In the spectral filter 32, the first reflecting film 323 and the second reflecting film 324 face to each other via a gap, and light having a wavelength corresponding to a size of the gap passes through the spectral filter 32.

The second substrate 322 includes a movable portion 322A on which the second reflecting film 324 is provided, and a holding portion 322B which holds the movable portion 322A, and advances and retreats the movable portion 322A to and from the first substrate 321.

The gap change portion 325 is configured by, for example, an electrostatic actuator or the like, and the size of the gap between the first reflecting film 323 and the second reflecting film 324 is changed by displacing the movable portion 322A toward the first substrate 321 side. Therefore, a wavelength of light passed through the spectral filter 32 is also changed.

The imaging portion 33 has a plurality of imaging pixels, receives light passed through the first reflecting film 323 and the second reflecting film 324 of the spectral filter 32, and captures a spectrum image.

The second communication portion 34 communicates with external devices such as the display apparatus 11 and the calibration apparatus 40. A communication method by the second communication portion 34 is not particularly limited thereto, and may be a method of being coupled by wire or may be a method of performing communication by wireless communication.

The second memory 35 is a recording portion which stores various information for controlling the spectral camera 30. Specifically, the second memory 35 records a correction matrix generated by the calibration apparatus 40, a drive table for driving the spectral filter 32, and the like. In addition, various programs for controlling the spectral camera 30 are recorded in the second memory 35. Details of the correction matrix will be described below.

The second processor 36 functions as an imaging control portion 361, an interpolation portion 362, and a color correction portion 363 by reading and executing the programs stored in the second memory 35.

The imaging control portion 361 controls the spectral filter 32 based on the drive table, and changes a wavelength of light passed through the spectral filter 32. Further, exposure control of the imaging portion 33 is performed so as to capture a spectrum image.

When a measurement point in the spectrum image is designated from the display apparatus 11, the interpolation portion 362 calculates a correction matrix for the measurement point by interpolation, by using a predetermined correction point stored in the second memory 35.

The color correction portion 363 corrects a color at the predetermined position of the spectrum image by using the correction matrix. Specifically, the color correction portion 363 corrects a measurement value at the predetermined position of the spectrum image and performs color conversion to a tristimulus value.

The spectral camera 30 of the present embodiment is used when performing color correction on a projector which is the display apparatus 11.

More specifically, the spectral camera 30 captures an image projected from the display apparatus 11 onto the projection target, and obtains spectrum images having a plurality of wavelengths. In addition, the spectral camera 30 receives a measurement point which is a colorimetry target from the display apparatus 11, calculates a tristimulus value for the measurement point in the spectrum image by using the correction matrix set by the calibration system 1, and transmits the tristimulus value to the display apparatus 11. Therefore, the display apparatus 11 can perform color correction by updating the drive parameter based on the tristimulus value for the measurement point.

Configuration of Calibration Apparatus 40

As illustrated in FIG. 2, the calibration apparatus 40 includes the third communication portion 41, the third memory 42, the third processor 43, and the like.

The third communication portion 41 is coupled to the display apparatus 11, the spectrophotometer 20, and the spectral camera 30, and communicates with the display apparatus 11, the spectrophotometer 20, and the spectral camera 30.

The third memory 42 stores various programs and various information for controlling the calibration apparatus 40.

The third processor 43 functions as a light output command portion 431, a measurement value obtainment portion 432, a reference value obtainment portion 433, an exposure correction portion 434, and a gradation value extraction portion 435, a normalization processing portion 436, and a matrix calculation portion 437 by reading and executing the program recorded in the third memory 42.

The light output command portion 431 commands the display apparatus 11 to output image light corresponding to a plurality of reference images. The reference image is, for example, a single color image of white, red, green, blue, and black, and seven patterns of reference images having different gradation values are used regarding white, red, green, and blue. In this case, image light beams of reference images with 29 colors are sequentially output from the display apparatus 11.

The measurement value obtainment portion 432 transmits a spectral measurement command of instructing the spectral camera 30 to capture a spectrum image, and receives the spectrum image from the spectral camera 30. When receiving the spectral measurement command, the spectral camera 30 sequentially changes a transmission wavelength of the spectral filter 32 and captures a spectrum image which is an image captured for each wavelength. At this time, spectrum images corresponding to a plurality of wavelengths are obtained from image light of one reference image. That is, each time a color of the image light emitted from the display apparatus 11 is changed, the spectrum images of the plurality of wavelengths are captured. For example, when a 16-band spectrum image is obtained for the reference images with 29 colors, 29×16 spectrum images are obtained.

The reference value obtainment portion 433 outputs a reference value measurement command to the spectrophotometer 20 and obtains a spectral reference value which is a measurement result. In the present embodiment, a tristimulus value of incident light measured by the spectrophotometer 20 is the spectral reference value.

The exposure correction portion 434 corrects a gradation value of each pixel of the spectrum image by dividing the gradation value by an exposure time when the image light is imaged by the imaging portion 33 of the spectral camera 30.

In the present embodiment, the spectral camera 30 measures an exposure time when image light is imaged by the imaging portion 33 and outputs the exposure time to the calibration apparatus 40 in association with the spectrum image. The exposure correction portion 434 corrects the gradation value of each pixel of the spectrum image based on the exposure time received together with the spectrum image by the measurement value obtainment portion 432.

The gradation value extraction portion 435 extracts a measurement value for a correction point among a plurality of spectrum images. This correction point indicates target coordinates for generating a correction matrix. The number and position of correction points are set in advance, and stored in the third memory 42.

In addition, the gradation value extraction portion 435 obtains a correction point and gradation values of surrounding pixels of the correction point so as to suppress influence of noise regarding the extraction of the measurement value of the correction point, and an average of the gradation values of these pixels is set to a measurement value for the correction point.

The normalization processing portion 436 normalizes the measurement value at the correction point and the spectral reference value by using a luminance value of the image light output from the display apparatus 11.

The matrix calculation portion 437 calculates a correction matrix for converting the measurement value into the spectral reference value by using the normalized measurement value and the spectral reference value. The correction matrix of the present embodiment is a color conversion matrix for converting the gradation value of the correction point of the spectrum image into a tristimulus value.

Calibration Method

The calibration system 1 of the present embodiment performs color correction on the spectral camera 30 which is a calibration target.

Figure 4:
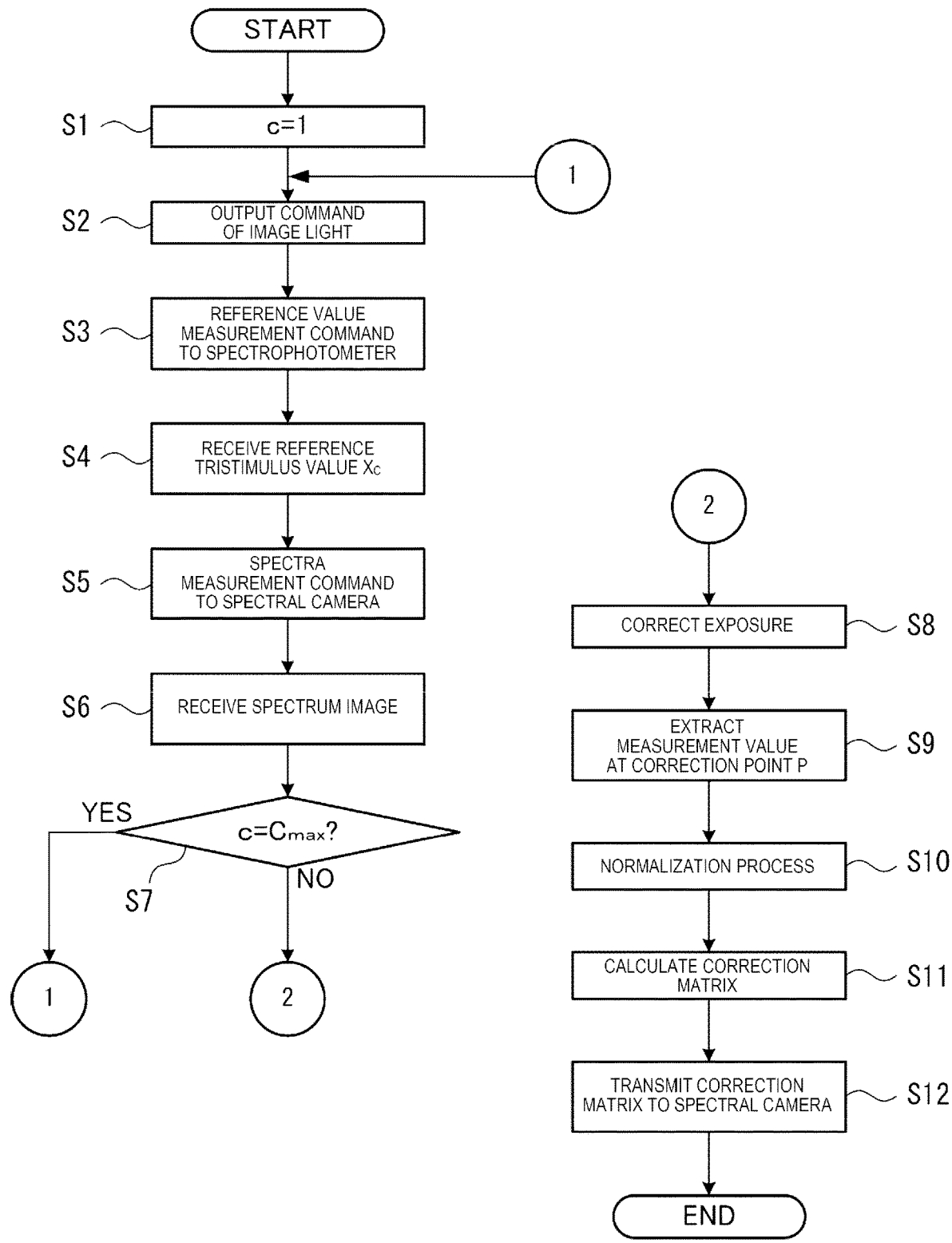
FIG. 4 is a flowchart illustrating a calibration method of a calibration apparatus according to the first embodiment.

FIG. 4 is a flowchart illustrating a calibration method according to the present embodiment.

In a calibration process of the spectral camera 30, that is, a correction matrix generation process, first, as illustrated in FIG. 1, the display apparatus 11, the spectrophotometer 20, and the spectral camera 30 are coupled to the integrating sphere 12, and the calibration apparatus 40 is commanded to start the calibration process.

Therefore, the calibration apparatus 40 first initializes a color variable c indicating a color of image light and sets c=1 (step S1). In the present embodiment, a maximum value of the color variable c is $C_{max}$, and $C_{max}$=29 in the display apparatus 11 by using reference images of 28 colors obtained by changing gradation values of white, red, green, and blue in 7 patterns and a reference image of black. The color variable and the color of the reference image are associated in advance.

The light output command portion 431 transmits an output command for emitting image light of the reference image corresponding to the color variable c to the display apparatus 11 (step S2). When the image light output command is input from the calibration apparatus 40 to the display apparatus 11 in step S2, the output control portion 114A of the display apparatus 11 controls the image light generation portion 111 based on the drive parameter, and causes the image light generation portion 111 to generate image light of a color corresponding to the color variable c and emits the image light to the integrating sphere 12.

The reference value obtainment portion 433 of the calibration apparatus 40 outputs a reference value measurement command to the spectrophotometer 20 (step S3). Therefore, the spectrophotometer 20 performs spectral measurement on uniform light emitted from the integrating sphere 12 and outputs a tristimulus value $x_C$ which is a spectral reference value. The tristimulus value $x_C$ which is the spectral reference value is hereinafter referred to as a reference tristimulus value $x_C$.

When the reference tristimulus value $x_C$ is received from the spectrophotometer 20 (step S4), the reference value obtainment portion 433 stores the reference tristimulus value $x_C$ in the third memory 42.

Further, the measurement value obtainment portion 432 of the calibration apparatus 40 outputs a spectral measurement command to the spectral camera 30 (step S5).

Therefore, the spectral camera 30 captures the uniform image light emitted from the integrating sphere 12 and obtains a spectrum image. Specifically, the imaging control portion 361 switches a wavelength of light passed through the spectral filter 32 into a plurality of wavelengths, and obtains a spectrum image for each wavelength.

Here, a spectrum image of a wavelength $\lambda_a$ with respect to image light of the color variable c is $D_0(x, y, c, \lambda_a)$. (x, y) indicates a pixel position of the spectrum image. Further, a is a variable corresponding to a wavelength of the spectrum image, and a maximum value of a is $a_{max}$. For example, when capturing a 16-band spectrum image from 400 nm to 700 nm at 20 nm intervals, $a_{max}$=16, $\lambda_1$=400 nm, and $\lambda_{16}$=700 nm, and 16 spectrum images of $D_0(x, y, c, \lambda_1)$ to $D_0(x, y, c, \lambda_{16})$ are obtained.

At this time, the spectral camera 30 measures an exposure time $t(c, \lambda_a)$ of the image light to the imaging portion 33 when a spectrum image of each wavelength is captured, and transmits the exposure time to the calibration apparatus 40 in association with the spectrum image.

When receiving a spectrum image $D_{C0}(x, y, c, \lambda_a)$ from the spectral camera 30 (step S6), the measurement value obtainment portion 432 of the calibration apparatus 40 stores the spectrum image in the third memory 42.

Next, the light output command portion 431 determines whether or not the color variable c reaches a maximum number (for example, $C_{max}$) of image light output from the display apparatus 11 (step S7), and when No is determined in step S7, 1 is added to the variable c and the process returns to step S2. That is, the color of the image light output from the display apparatus 11 is changed, and the processes from step S3 to step S6 are repeated.

When it is determined Yes in step S7, the exposure correction portion 434 divides a spectrum image $D_0(x, y, c, \lambda_a)$ by the exposure time $t(c, \lambda_a)$ as indicated in the following equation (1) and corrects exposure, and obtains a correction spectrum image $D(x, y, c, \lambda_a)$ (step S8). Therefore, fluctuation of the light amount due to a difference in the exposure time when each image light is captured at each wavelength is corrected.

$$D(x, y, c, \lambda_a) = \frac{D_0(x, y, c, \lambda_a)}{t(c, \lambda_a)} \quad (1)$$

Next, the gradation value extraction portion 435 extracts a measurement value $S(i, j, c, \lambda_a)$ at a correction point $(x_i, y_j)$, which is a target position for calculating a correction matrix, from each spectrum image (step S9). Specifically, the gradation value extraction portion 435 extracts a gradation value $\{s(c, \lambda_a)\}_{i,j}$ of a pixel of $|x-x_i| \leq \Delta$, $|y-y_j| \leq \Delta$ from each spectrum image. $\Delta$ is a preset value, and for example, when extracting a pixel within one pixel from a correction point, $\Delta$=1. An average value of gradation values of these pixels is calculated and set as a measurement value $S(i, j, c, \lambda_a)$.

Here, in the following description, a measurement value $s_C$ in the spectrum image and the reference tristimulus value $x_C$ are defined as follows.

$$s_C = \begin{pmatrix} s(c, \lambda_1) \\ \vdots \\ s(c, \lambda_{a,max}) \end{pmatrix} \quad x_C = \begin{pmatrix} X(c) \\ Y(c) \\ Z(c) \end{pmatrix}$$

Thereafter, as indicated in the following equations (2) and (3), the normalization processing portion 436 normalizes the measurement value $S_C$ and the reference tristimulus value $x_C$ by dividing the measurement value $S_C$ and the reference tristimulus value $x_C$ by a luminance value $Y_C$ of image light when the image light of the color variable c is output from the display apparatus 11 (step S10).

$$A = \left( \frac{s_1}{Y_1} \cdots \frac{s_c}{Y_c} \right)_{c \in C} \quad (2)$$

$$B = \left( \frac{x_1}{Y_1} \cdots \frac{x_c}{Y_c} \right)_{c \in C} \quad (3)$$

In the equations (2) and (3), C is a set of colors of the measured image light. That is, the normalization processing portion 436 divides the measurement value $s_C$ of each correction point P of a spectrum image corresponding to each wavelength ($\lambda_1$ to $\lambda_{amax}$) by the luminance value $Y_C$ of the image light regarding one image light. The normalization processing portion 436 performs this calculation for each of all the image light beams output from the display apparatus 11 so as to obtain a normalized measurement value A.

In addition, the normalization processing portion 436 divides the reference tristimulus value $x_C$ obtained by measuring one image light with the spectrophotometer 20 by the luminance value $Y_C$ of the image light, and performs this calculation for each of all the image light beams output from the display apparatus 11 so as to obtain a normalized reference value B.

Therefore, when the number of colors of the measured image light is $C_{max}$, the normalized measurement value A is a matrix of $a_{max} \times C_{max}$ and the normalized reference value B is a matrix of $3 \times C_{max}$. Further, the normalized measurement value A and the normalized reference value B are calculated by the number of correction points.

After the above, the matrix calculation portion 437 calculates a correction matrix $M(i, j)$ for converting a measurement value into a tristimulus value based on the following equation (4) (step S11).

$$M(i,j) = \{AA' - \beta I)^{-1} AB'\}' \quad (4)$$

In the equation (4), $\beta$ is a regularization coefficient for preventing overfitting, and I is a unit matrix of $a_{max} \times a_{max}$.

Thereafter, the matrix calculation portion 437 transmits the calculated correction matrix $M(i, j)$ to the spectral camera 30 (step S12). Therefore, the spectral camera 30 stores the received correction matrix $M(i, j)$ in the second memory 35.

In the calculation of the correction matrix $M(i, j)$ as described above, since the normalization process is performed in step S10, it is possible to perform color conversion with a small error even for a dark color with a small brightness.

Generally, when a dark color is perceived by human eyes, color determination accuracy is higher in a dark environment than in a bright environment. For example, when an image is displayed by image light irradiating from the display apparatus 11 in a dark place, the human eye more clearly distinguishes a difference in a dark color as compared when displaying the image light in a bright place. Here, when the normalization process in step S10 is not performed, color conversion errors when converting the measurement value Sc measured by the spectral camera 30 into a tristimulus value are approximately the same for a bright color and a dark color. In this case, a color conversion error for a dark color in a dark place becomes large, and there is a possibility that the above-described color conversion corresponding to human eyes cannot be performed. On the other hand, in the present embodiment, the color conversion error in a dark place can be suppressed by performing the process in step S10.

Image Correction Process

Next, an image correction process in the display apparatus 11 and a measurement process in the spectral camera 30 will be described.

Figure 5:
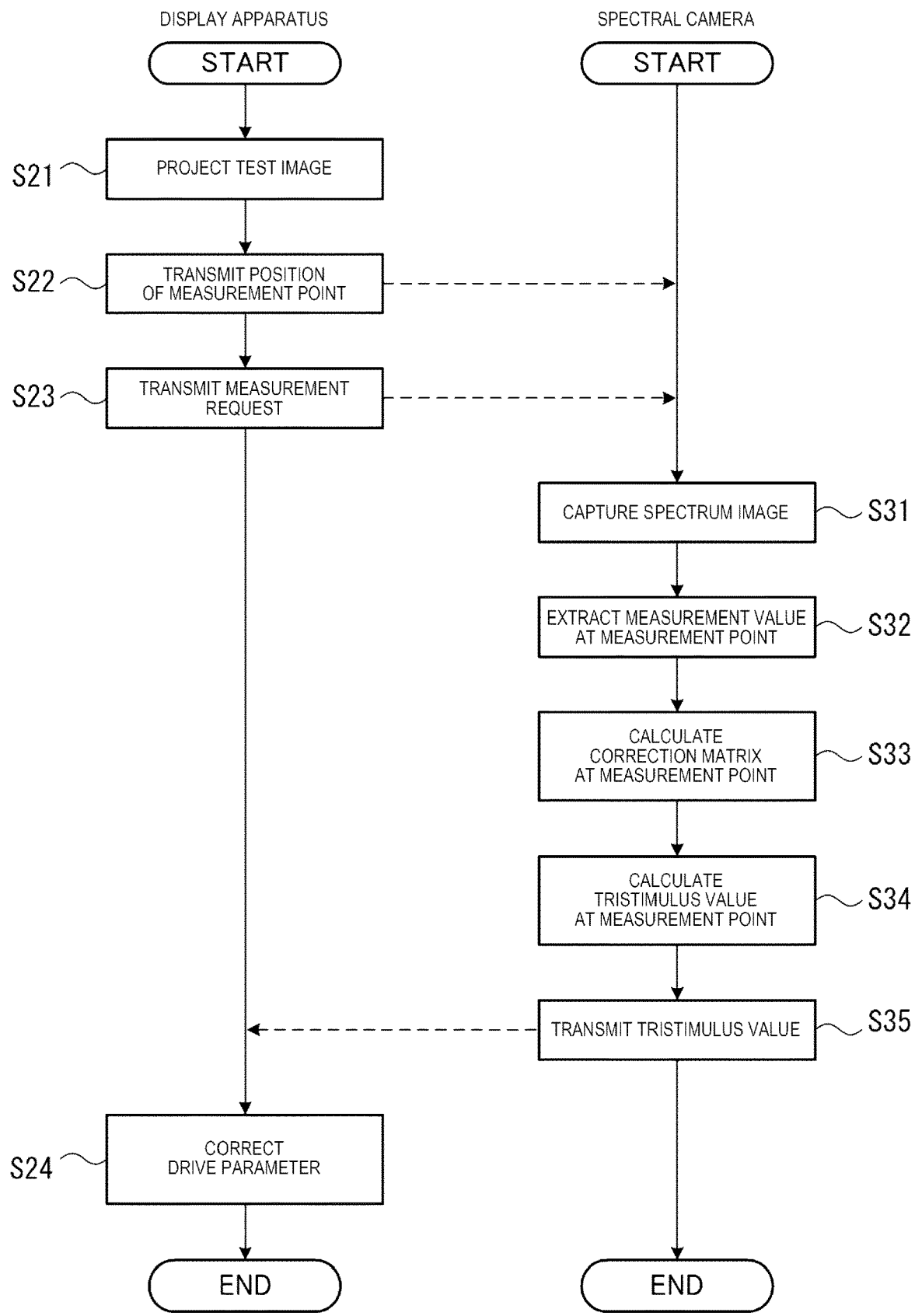
FIG. 5 is a flowchart illustrating an image correction process of correcting an image of a display apparatus according to the first embodiment.

FIG. 5 is a flowchart illustrating the image correction process.

When image correction is performed by the display apparatus 11 according to the present embodiment, the output control portion 114A controls the image light generation portion 111 so as to project a predetermined test image onto a projection target (step S21). The image to be projected may be the above-described reference image or another test pattern image.

Next, the display apparatus 11 transmits position coordinates at a measurement point in the image to the spectral camera 30 (step S22), and transmits a colorimetry request for performing a colorimetry process to the spectral camera 30 (step S23).

Figure 6:
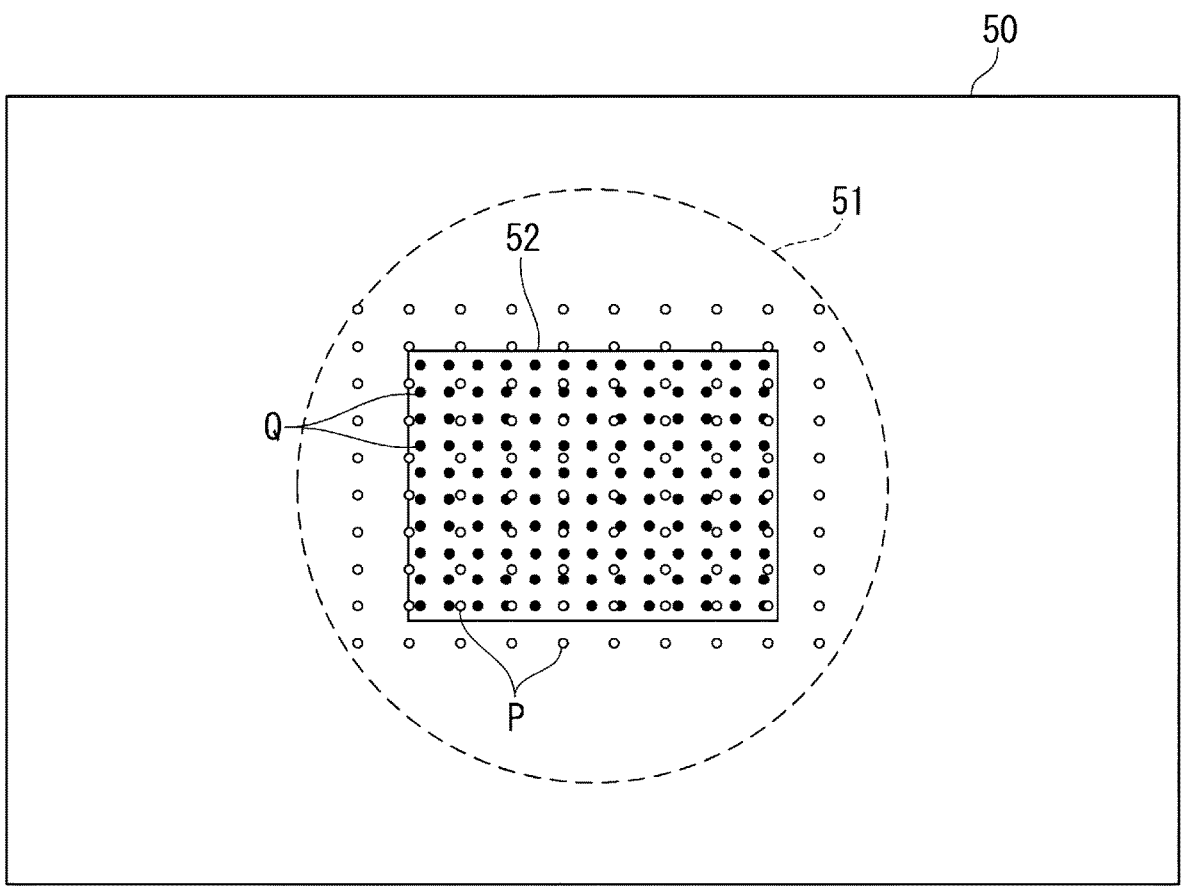
FIG. 6 is a diagram illustrating an example of a relationship between a correction point of the first embodiment and a measurement point of the display apparatus.

Here, FIG. 6 illustrates a relationship between the correction point P for which a correction matrix is calculated by the calibration apparatus 40 and a measurement point Q of the display apparatus 11. In FIG. 6, the correction point P is indicated by a white circle, and the measurement point Q is indicated by a black circle. The outer frame 50 is an outer frame of a captured image captured by the imaging portion 33 of the spectral camera 30. The dashed circle is a region in which the first reflecting film 323 and the second reflecting film 324 of the spectral filter 32 overlap each other in the spectral camera 30, and illustrates a spectral range 51 of light in which the light separated by the spectral filter 32 is incident, in the captured image. In the present embodiment, the spectral range 51 is included inside the outer frame 50 of the image captured by the imaging portion 33, but the imaging range may be set so that a predetermined region in the spectral range 51 is captured by the imaging portion 33.

Further, in FIG. 6, the inner frame 52 indicates a display image formed by projecting image light from the display apparatus 11 onto the projection target. That is, positions of the display apparatus 11, the spectral camera 30, and the projection target are set so that the display image is included in the spectral range 51.

When receiving a colorimetry request from the display apparatus 11, the imaging control portion 361 of the spectral camera 30 captures a spectrum image of the image projected on the projection target (step S31).

Specifically, the imaging control portion 361 switches a wavelength of light passed through the spectral filter 32 into a plurality of wavelengths, and obtains a spectrum image for each wavelength. Further, the imaging control portion 361 corrects a gradation value by dividing the gradation value of each pixel of the spectrum image of each wavelength by an exposure time when a spectrum image of the corresponding wavelength is captured.

In step S22, the imaging control portion 361 extracts the measurement value $S(m, n, \lambda_a)$ of the measurement point Q for the spectrum image of each wavelength (step S32).

Specifically, in the same manner as step S9 executed by the calibration apparatus 40, a gradation value $\{s(\lambda_a)\}_{m,n}$ of a pixel of $|x-x_m| \leq \Delta$, $|y-y_n| \leq \Delta$ is extracted from each spectrum image. An average value of gradation values $\{s(\lambda_a)\}_{m,n}$ of these pixels is calculated and set as a measurement value $S(m, n, \lambda_a)$.

Thereafter, the interpolation portion 362 of the spectral camera 30 obtains a correction matrix for the measurement point Q by interpolation (step S33).

That is, the correction matrix stored in the second memory 35 of the spectral camera 30 is for the predetermined correction point P within a spectral range of the spectrum image. Meanwhile, as illustrated in FIG. 6, the measurement point Q commanded from the display apparatus 11 and the correction point P do not always coincide with each other.

Therefore, as indicated in the following equation (5), the interpolation portion 362 calculates the correction matrix $M(m, n)$ of the measurement point Q at a position $(m, n)$ from the correction matrix $M(i, j)$ of the correction point P by interpolation.

$$M(m, n) = \frac{\begin{array}{l}(x_{i+1} - x_m)(y_{j-1} - y_n)M(i, j) + \\ (x_m - x_i)(y_{j+1} - y_n)M(i+1, j) + \\ (x_{+1} - x_m)(y_n - y_j)M(i, j+1) + \\ (x_m - x_i)(y_n - y_j)M(i+1, j+1)\end{array}}{(x_{i+1} - x_i)(y_{j+1} - y_j)} \quad (5)$$

By using the correction matrix (m, n) for the measurement point Q of the spectrum image and the measurement value S (m, n) of each spectrum image for the measurement point Q, as indicated in the following equation (6), the color correction portion 363 of the spectral camera 30 calculates a tristimulus value X(m, n) at the measurement point Q (step S34).

$$X(m,n) = M(m,n) \times S(m,n) \quad (6)$$

Thereafter, the spectral camera 30 transmits the calculated tristimulus value X(m, n) to the display apparatus 11 (step S35).

When receiving the tristimulus value X(m, n) for the measurement point Q from the spectral camera 30, the image correction portion 114C of the display apparatus 11 corrects a drive parameter when the image light generation portion 111 is driven, by comparing the tristimulus value with original data of the test image (step S24).

Effect of Present Embodiment

The calibration apparatus 40 according to the present embodiment includes the third processor 43 which functions as the measurement value obtainment portion 432, the reference value obtainment portion 433, the gradation value extraction portion 435, the normalization processing portion 436, and the matrix calculation portion 437. The measurement value obtainment portion 432 obtains a spectrum image which is an image captured when the spectral camera 30 images uniform light from the light source portion 10. The reference value obtainment portion 433 obtains a spectral reference value when the uniform light is measured by the spectrophotometer 20 which is a calibration reference device, that is, the reference tristimulus value $x_C$. The gradation value extraction portion 435 extracts a gradation value of a correction point which is a generation target of a correction matrix from the spectrum image as the measurement value $s_C$. The normalization processing portion 436 divides the reference tristimulus value $x_C$ and the measurement value $s_C$ by the luminance value $Y_C$ of the uniform light emitted from the light source portion 10 so as to obtain the normalized measurement value A and the normalized reference value B. The matrix calculation portion 437 calculates the correction matrix M(i, j) by using the normalized measurement value A and the normalized reference value B according to the equation (4).

When the correction matrix is calculated without performing the normalization process on the measurement value or the spectral reference value, conversion errors of the correction matrix are approximately the same for a bright color and a dark color. On the other hand, in the calibration apparatus 40 of the present embodiment, the reference tristimulus value $x_C$ and the measurement value $s_C$ are divided by the luminance value $Y_C$ of the image light so as to be normalized, so that a color conversion error for the dark color can be suppressed.

Further, in the spectral filter 32, in some cases, a spectral wavelength in the surface is shifted. In the present embodiment, since the uniform light in the surface is imaged by the spectral camera 30, it is possible to calculate a correction matrix in which the wavelength unevenness generated in the spectral filter is corrected.

In the present embodiment, the light source portion 10 includes the display apparatus 11 which outputs image light, and the integrating sphere 12 which uniformizes the image light.

Although the image light output from the display apparatus 11 includes uneven illumination, the light amount of the image light can be made uniform by making the image light incident onto the integrating sphere 12.

Further, when the image correction for the display apparatus 11 is performed by using the spectral camera 30, it is possible to improve correction accuracy of the image correction for the display apparatus 11 by calculating a correction matrix based on the image light output from the display apparatus 11.

In the present embodiment, the third processor 43 functions as the exposure correction portion 434 which divides a gradation value of a spectrum image by the exposure time t(c, λ) when uniform light is measured by the spectral camera 30. For this reason, it is possible to correct a difference in gradation value due to a difference in exposure time.

Further, the spectral camera 30 of the present embodiment includes the second memory 35 which stores the correction matrix calculated by the calibration apparatus 40. The second processor 36 of the spectral camera 30 functions as the color correction portion 363, corrects a color of a predetermined pixel of the spectrum image by using the correction matrix, and converts the color into a tristimulus value.

Therefore, it is possible to improve colorimetry accuracy of the spectral camera 30.

In addition, the second processor 36 of the spectral camera 30 functions as the interpolation portion 362. When receiving coordinates (m, n) of the measurement point Q in the spectrum image from the display apparatus 11, the interpolation portion 362 obtains the correction matrix M(m, n) for the measurement point Q from the correction matrix M(i, j) for a plurality of correction points P by interpolation.

Therefore, even when a position of the measurement point Q is different from the correction point P, the correction matrix M(m, n) for the measurement point Q can be calculated, and the color correction portion 363 can correct a gradation value of the measurement point Q of the spectrum image and convert the gradation value into a tristimulus value.

In addition, the first processor 114 of the display apparatus 11 according to the present embodiment functions as the colorimetry command portion 114B and the image correction portion 114C. The colorimetry command portion 114B transmits the coordinates (m, n) of the measurement point Q to the spectral camera 30 and commands execution of colorimetry. The image correction portion 114C receives the tristimulus value which is a colorimetry result for the measurement point Q, and corrects a drive parameter of the image light generation portion 111. Therefore, it is possible to correct the image of the display apparatus 11.

Second Embodiment

Next, a second embodiment will be described.

The second embodiment is the calibration system 1 having the same configuration as the first embodiment, and a part of the calibration method in the calibration apparatus 40 is different from the first embodiment.

In the following description, the same reference numerals are given to the components already described, and the description thereof will be omitted or simplified.

The calibration system 1 according to the second embodiment includes the light source portion 10 having the display apparatus 11 and the integrating sphere 12, the spectrophotometer 20, the spectral camera 30, and the calibration apparatus 40, in the same manner as the first embodiment. In the present embodiment, processes of the normalization processing portion 436 and the matrix calculation portion 437 of the calibration apparatus 40 are different from those of the first embodiment.

That is, in the same manner as the first embodiment, the calibration apparatus 40 of the present embodiment performs the processes from step S1 to step S9, and obtains the measurement value $s_C$ and the reference tristimulus value $x_C$.

At this time, the calibration apparatus 40 of the present embodiment respectively obtains a measurement value and a reference tristimulus value when black image light is output from the display apparatus 11 as a black measurement value $s_k$ and a black reference tristimulus value $x_k$.

The measurement value $s_C$, the reference tristimulus value $x_C$, the black measurement value $s_k$, and the black reference tristimulus value $x_k$ include the following components.

$$s_C = \begin{pmatrix} s(c, \lambda_1) \\ \vdots \\ s(c, \lambda_{a,max}) \end{pmatrix} \quad s_k = \begin{pmatrix} s(k, \lambda_1) \\ \vdots \\ s(k, \lambda_{a,max}) \end{pmatrix}$$

$$x_C = \begin{pmatrix} X(c) \\ Y(c) \\ Z(c) \end{pmatrix} \quad x_k = \begin{pmatrix} X(k) \\ Y(k) \\ Z(k) \end{pmatrix}$$

In the present embodiment, in step S10, a normalization process is performed as illustrated in the following equations (7) to (10) for a black component and a color other than black. The black component includes black and other low-gradation colors close to black. For example, nine colors of colors having the lowest gradation values and colors having the second lowest gradation values of white, red, green, and blue, and black are set as black components. Hereinafter, a group of black component colors is represented by "K". In the present embodiment, "C" represents a group of colors of image light other than black.

$$A_C = \left( \frac{s_1 - s_k}{Y_1 - Y_K} \quad \cdots \quad \frac{s_c - s_k}{Y_c - Y_K} \right)_{c \in C} \quad (7)$$

$$B_C = \left( \frac{x_1 - x_k}{Y_1 - Y_k} \quad \cdots \quad \frac{x_c - x_k}{Y_c - Y_k} \right)_{c \in C} \quad (8)$$

$$A_K = \left( \frac{s_1}{Y_1} \quad \cdots \quad \frac{s_c}{Y_c} \right)_{c \in K} \quad (9)$$

$$B_K = \left( \frac{x_1}{Y_1} \quad \cdots \quad \frac{x_c}{Y_c} \right)_{c \in K} \quad (10)$$

The normalization processing portion 436 calculates a normalized measurement value $\lambda_C$ and a normalized reference value $B_C$ for color components other than black, as illustrated in equations (7) and (8). In addition, the normalization processing portion 436 calculates a black color normalized measurement value $A_K$ and a black color normalized reference value $B_K$ for black color components, as illustrated in equations (9) and (10).

Next, the matrix calculation portion 437 calculates a normal correction matrix $M_C(i, j)$ and a black color correction matrix $M_K(i, j)$ according to the following equations (11) and (12).

$$M_C(i,j) = \{A_C A_C{}' - \beta_C I)^{-1} A_C B_C{}'\}' \quad (11)$$

$$M_K(i,j) = \{A_K A_K{}' - \beta_K I)^{-1} A_K B_K{}'\}' \quad (12)$$

Further, when performing image correction for the display apparatus 11, approximately the same process as in the first embodiment is performed.

That is, in step S21, the display apparatus 11 outputs a test image to a projection target so as to display the image. Steps S22 and S23 are performed so as to transmit coordinates of the measurement point Q and a colorimetry request to the spectral camera 30. At this time, the display apparatus 11 displays a black image in addition to the test image.

Therefore, the spectral camera 30 performs steps S31 to S33 on both the test image and the black image, and calculates a correction matrix for the measurement point Q by interpolation. In the interpolation, the normal correction matrix $M_C(m, n)$ and the black color correction matrix $M_K(m, n)$ for the measurement point Q are respectively calculated in the same manner as in the equation (5).

The color correction portion 363 converts the measurement value $S_C(m, n)$ at the measurement point Q into the tristimulus value X(m, n) according to the following equation (13). $S_K(m, n)$ is a gradation value of the measurement point Q in the black image.

$$X(m,n) = X_C + X_K = M_C(m,n) \times (S_C(m,n) - S_K(m,n)) + M_K(m,n) \times S(m,n) \quad (13)$$

In the second embodiment, the display apparatus 11 outputs a plurality of single color image light beams including black and a plurality of low-gradation colors close to black. The normalization processing portion 436 respectively calculates the normalized measurement value $\lambda_C$, the normalized reference value $B_C$, the black color normalized measurement value $A_K$, and the black color normalized reference value $B_K$. Further, the matrix calculation portion 437 calculates the normal correction matrix $M_C(i, j)$ based on the normalized measurement value $A_C$ and the normalized reference value $B_C$, and calculates the black color correction matrix $M_K(i, j)$ based on the black color normalized measurement value $A_K$ and the black color normalized reference value $B_K$.

As described above, by separately obtaining the normal correction matrix $M_C(i, j)$ for colors other than black and the black color correction matrix $M_K(i, j)$ corresponding to black, it is possible to further improve correction accuracy and color conversion accuracy when the measurement values for dark colors are converted into tristimulus values.

Third Embodiment

Next, a third embodiment will be described.

In the first and second embodiments, in step S9, the measurement values S(i, j, c, $\lambda_a$) for all the wavelengths from $\lambda_1$ to $\lambda_{amax}$ are extracted from the image data for the preset correction point P. On the other hand, the third embodiment is different from the first and second embodiments in that a plurality of pieces of learning data are set and learning is repeated so as to search for an optimum value.

Figure 7:
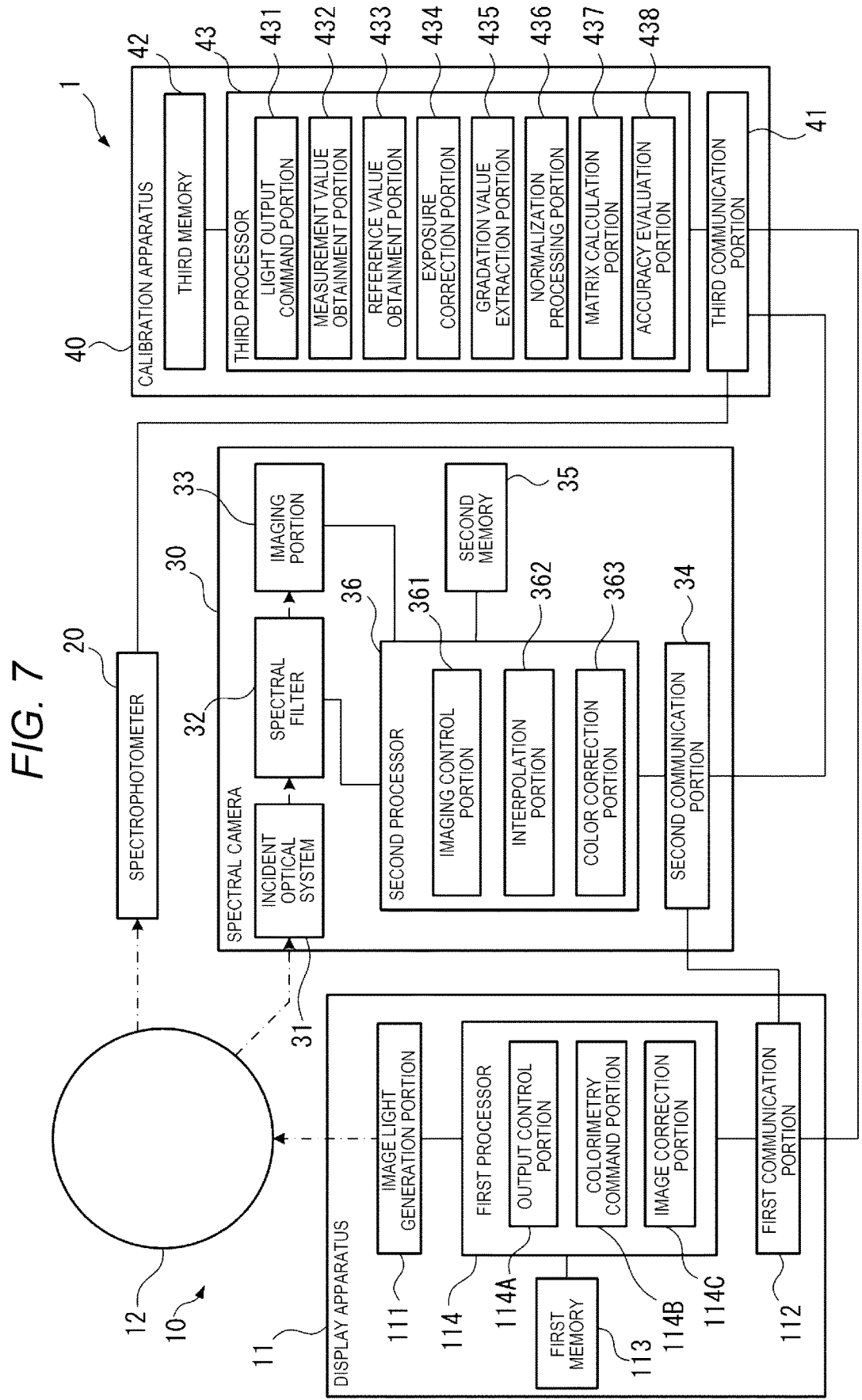
FIG. 7 is a block diagram illustrating a calibration system according to a third embodiment.

FIG. 7 is a block diagram illustrating a calibration system according to the present embodiment. The calibration system 1 according to the second embodiment includes the light source portion 10, the spectrophotometer 20, the spectral camera 30 to be calibrated, and the calibration apparatus 40, in the same manner as the first embodiment. In the calibration apparatus 40 according to the present embodiment, the third processor 43 also functions as an accuracy evaluation portion 438 by reading and executing a program recorded in the third memory 42.

The accuracy evaluation portion 438 evaluates correction accuracy of a correction matrix calculated by the matrix calculation portion 437. Specifically, the accuracy evaluation portion 438 converts a measurement value of each pixel of a spectrum image into a tristimulus value by using the calculated correction matrix and compares the result with a spectral reference value measured by the spectrophotometer 20, and evaluates correction accuracy of the correction matrix. In the present embodiment, learning data for calculating the correction matrix is changed and the calculation process of the correction matrix is repeatedly performed until a correction matrix with sufficiently high correction accuracy by the accuracy evaluation portion 438 is calculated. When it is determined that the correction accuracy becomes sufficiently high, the accuracy evaluation portion 438 adopts the correction matrix and transmits the correction matrix to the spectral camera 30.

Next, a calibration method of the calibration apparatus 40 according to the present embodiment will be described.

Figure 8:
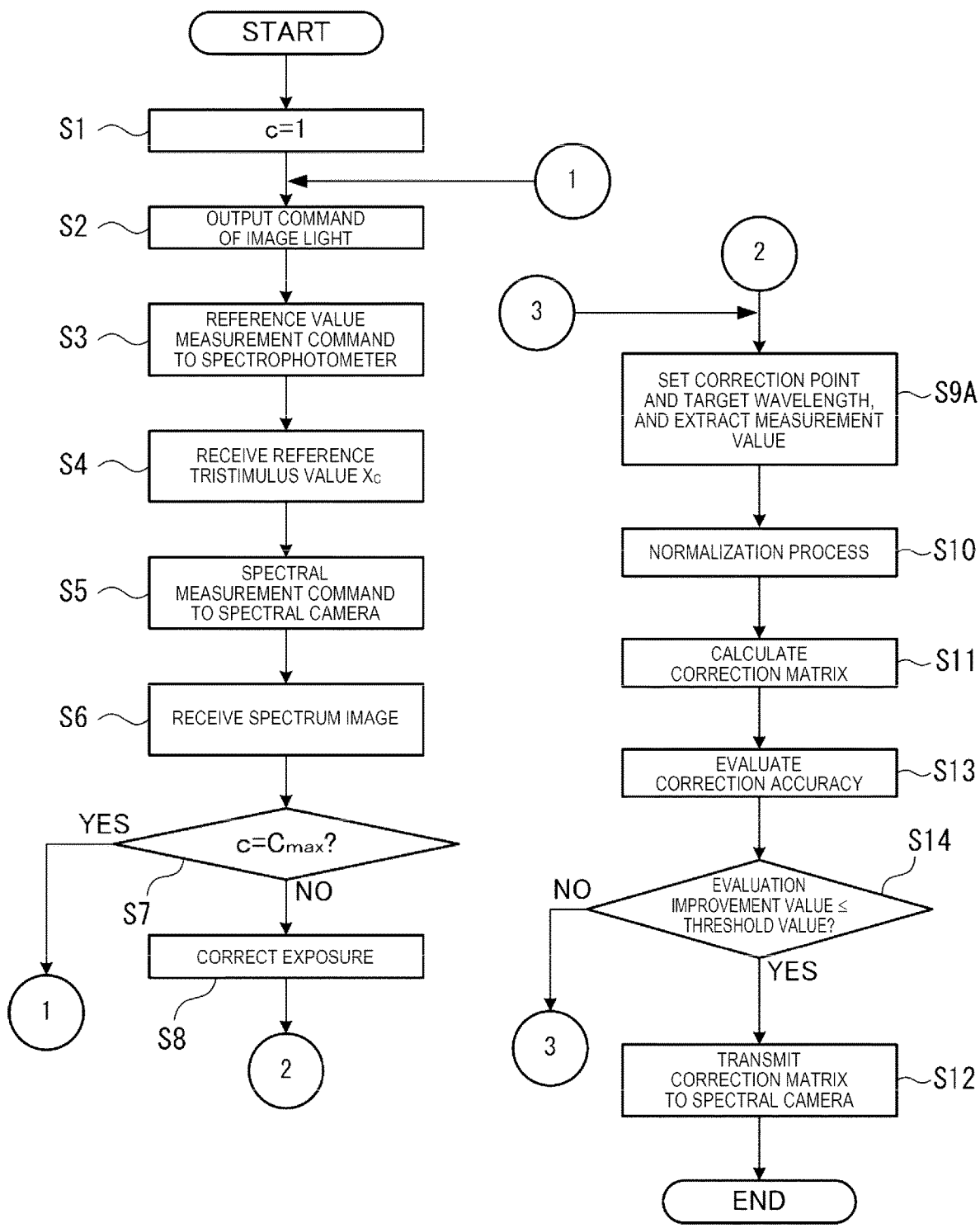
FIG. 8 is a flowchart illustrating a calibration method of a calibration apparatus according to the third embodiment.

FIG. 8 is a flowchart illustrating a calibration method according to the third embodiment.

In the same manner as the first embodiment or the second embodiment, in the present embodiment, the calibration apparatus 40 performs the processes from step S1 to step S8 so as to cause the spectrophotometer 20 to measure image light and cause the spectral camera 30 to capture a spectrum image of the image light, and perform exposure correction on the spectrum image according to an exposure time.

In the present embodiment, the gradation value extraction portion 435 performs the process in step S9A instead of step S9. In step S9A, the gradation value extraction portion 435 extracts a target wavelength and the correction point P. That is, in the present embodiment, learning data is changed as described above, and calculation of the correction matrix M(i, j) is repeatedly performed, but in step S9A, learning data used for each time is extracted.

In step S9A to be performed for the first time, the gradation value extraction portion 435 extracts the correction point P and the target wavelength set in advance, and sets the correction point P and the target wavelength as a first setting. In the present embodiment, measurement values of target wavelengths of a part or all of the measurement values $S(i, j, c, \lambda_a)$ for all the wavelengths from Ai to $\lambda_{amax}$ are extracted. Here, in the following description, the target wavelength to be extracted is indicated as $\lambda_b$. b is a variable indicating a target wavelength, and is a value from 1 to $N_\lambda$ ($N_\lambda \leq a_{max}$).

In the process in step S9A after the second time, the gradation value extraction portion 435 generates a plurality of pieces of learning data in which at least one of the target wavelength $\lambda_b$ and the correction point P of the first setting is partially changed, and sets the learning data as a second setting. At this time, the number of target wavelengths $\lambda_b$ or correction points P may be changed.

Next, the calibration apparatus 40 performs the process from step S10 to step S11 on each learning data, and calculates each correction matrix M(i, j).

Thereafter, the accuracy evaluation portion 438 evaluates each correction accuracy of the correction matrix M(i, j) calculated based on each learning data (step S13).

Specifically, the accuracy evaluation portion 438 corrects the measurement value $S_C$ of each pixel of a spectrum image of the target wavelength $\lambda_b$ for the predetermined color variable c by using the calculated correction matrix M(i, j), and calculates the tristimulus value (X(x, y), Y(x, y), Z(x, y)). The calculated tristimulus value (X(x, y), Y(x, y), Z(x, y)) of each pixel is converted to a color value $H_C=(L^*_C(x, y), a^*_C(x, y), b^*_C(x, y))$. This color value $H_C$ is referred to as a target color value $H_C$. The pixel which is a calculation target for the target color value $H_C$ may be all pixels of the spectrum image, or may be some pixels set in advance.

In addition, the accuracy evaluation portion 438 converts the spectral reference value (X(c), Y(c), Z(c)) measured by the spectrophotometer 20 into the color value $H_{C0}=(L^*_{C0}, a^*_{C0}, b^*_{C0})$. This color value $H_{C0}$ is referred to as a reference color value $H_{C0}$.

The accuracy evaluation portion 438 calculates a color difference $\Delta E(x, y)$ of each pixel (x, y) between the target color value $H_C$ and the reference color value $H_{C0}$ according to the following equation (14).

$$\Delta E(x, y) = \sqrt{\{L^*_C(x, y) - L^*_{C0}\}^2 + \{a^*_C(x, y) - a^*_{C0}\}^2 + \{b^*_C(x, y) - b^*_{C0}\}^2} \quad (14)$$

The smaller the color difference $\Delta E(x, y)$, the higher accuracy of the correction matrix. The number ($N_\lambda$) of the target wavelengths $\lambda_b$ and the number ($N_{xy}$) of the correction points P may small, and $N_\lambda$ and $N_{xy}$ are also important in evaluating accuracy of the correction matrix.

Therefore, in the present embodiment, the accuracy evaluation portion 438 calculates an evaluation index value V indicated in the following equation (15), including the color difference $\Delta E(x, y)$, the number ($N_\lambda$) of target wavelengths $\lambda_b$, and the number ($N_{xy}$) of correction points P as an index for evaluating accuracy of the correction matrix M(i, j).

$$V = (1-\alpha-\beta)\text{average}(\Delta E(x,y)) + \alpha N_\lambda + \beta N_{xy} \quad (15)$$

In equation (15), "average ($\Delta E(x, y)$)" represents an average value of the color differences $\Delta E(x, y)$ of respective pixels of the spectrum image. Further, $\alpha$ and $\beta$ represent weighting coefficients.

Next, the accuracy evaluation portion 438 calculates an absolute value of a value obtained by subtracting a minimum value of the evaluation index value V calculated in step S13 from a minimum value of a previous evaluation index value $V_{past}$ as an evaluation improvement value, and determines whether or not the evaluation improvement value is equal to or less than a predetermined threshold value (step S14). When YES is determined in step S14, it is determined that the degree of improvement in accuracy is small and the correction matrix approaches an optimum correction matrix, and the process is moved to step S12.

In the present embodiment, in step S12, the matrix calculation portion 437 transmits not only the correction matrix M(i, j) but also the target wavelength $\lambda_b$ and the correction point P to the spectral camera 30. Therefore, the spectral camera 30 stores the correction matrix M(i, j), the target wavelength $\lambda_b$, and the correction point P in the second memory 35. In this case, the spectral camera 30 captures a spectrum image for the target wavelength $\lambda_b$ in step S31, and the interpolation portion 362 calculates a correction matrix at the measurement point Q by interpolation, by using information on the correction point P in step S33.

On the other hand, when NO is determined in the step S14, it is determined that there is room for improvement in the accuracy of the correction matrix, and the process returns to the step S9A.

At this time, when the value obtained by subtracting the minimum value of the evaluation index value V calculated in step S13 from the minimum value of the previous evaluation index value $V_{past}$ is a positive value, this means that the newly calculated evaluation index value V is smaller than the previous time and the accuracy is higher. In this case, when performing the next step S9A, the gradation value extraction portion 435 sets learning data corresponding to the newly calculated evaluation index value V as the first setting, and generates a plurality of pieces of new learning data in which at least one of the target wavelength $\lambda_b$ and the correction point P of the first setting is partially changed. Further, when the value obtained by subtracting the minimum value of the evaluation index value V calculated in step S13 from the minimum value of the previous evaluation index value $V_{past}$ is a negative value, this means that the newly calculated evaluation index value V is larger than the previous time and the accuracy is lower. Therefore, in step S9A, the gradation value extraction portion 435 sets learning data corresponding to a minimum value of the evaluation index value $V_{past}$ as the first setting, and generates a plurality of pieces of new learning data in which at least one of the target wavelength $\lambda_b$ and the correction point P of the first setting is partially changed.

Effect of Present Embodiment

In the present embodiment, the calibration apparatus 40 further includes the accuracy evaluation portion 438 and evaluates correction accuracy of the correction matrix M(i, j) calculated by the matrix calculation portion 437.

Therefore, it is possible to confirm the correction matrix with high correction accuracy.

In the present embodiment, the gradation value extraction portion 435 generates a plurality of pieces of learning data in which at least one of a position of the correction point P, the number $N_{xy}$ of the correction points P, the target wavelength $\lambda_b$ for extracting the measurement value at the correction point P, and the number $N_\lambda$ of the target wavelength $\lambda_b$ is changed. Further, the matrix calculation portion 437 calculates the correction matrix M(i, j) for each of the pieces of learning data. The accuracy evaluation portion 438 calculates and evaluates the evaluation index value V for the correction matrix M(i, j) for each learning data, and adopts the correction matrix M(i, j) having the highest evaluation, that is, the correction matrix M(i, j) corresponding to the minimum evaluation index value V.

Therefore, in the present embodiment, by using various types of learning data in which the position of the correction point P, the number $N_{xy}$ of the correction points P, the target wavelength $\lambda_b$, and the number $N_\lambda$ of the target wavelength $\lambda_b$ are changed, it is possible to adopt the correction matrix configured to convert a measurement value into a value closest to a spectral reference value and it is possible to obtain the correction matrix with high correction accuracy.

In the present embodiment, the gradation value extraction portion 435 sets learning data corresponding to the correction matrix evaluated to have highest evaluation by the accuracy evaluation portion 438 as the first setting and generates new learning data in which at least one of the position of the correction point P, the number $N_{xy}$ of the correction points P, the target wavelength $\lambda_b$, and the number $N_\lambda$ of the target wavelength $\lambda_b$ of the first setting is changed as the second setting.

When a difference between the correction matrix M(i, j) calculated based on the new learning data and the correction matrix M(i, j) calculated based on the previous learning data, that is, an evaluation improvement value is equal to or smaller than a predetermined threshold value, the accuracy evaluation portion 438 adopts the correction matrix M(i, j) based on the new learning data. In this case, it is possible to reduce the number of repetitions of the calculation process of the correction matrix required to search for the optimum correction matrix M(i, j), and it is possible to obtain the correction matrix M(i, j) with high correction accuracy and efficiency.

MODIFICATION EXAMPLE

The present disclosure is not limited to each embodiment described above, and modifications and improvements within the scope indicated in the object of the present disclosure and configurations obtained by appropriately combining the embodiments are included in the present disclosure.

Modification Example 1

In the embodiment described above, the correction matrix is calculated based on a least-squares method using equation (6) or equations (11) and (12), but the present embodiment is not limited thereto. The matrix calculation portion 437 may calculate the correction matrix by using, for example, a principal component regression method or a partial least-squares regression method.

Modification Example 2

In the embodiment described above, the spectrophotometer 20 measures the tristimulus value, and the measurement value at the correction point P of the spectral camera is corrected and the correction matrix for performing color conversion into the tristimulus value is calculated, but the present embodiment is not limited thereto.

For example, the spectrophotometer may be a reference calibrator which measures other color coordinates such as L*a*b* values and reflectance spectra. In this case, the matrix calculation portion 437 can calculate a correction matrix for converting the measurement value into an L*a*b* value, a reflection spectrum, or the like.

Further, the spectrophotometer 20 is used as a calibration reference device, but a calibrated spectral camera may be used.

Modification Example 3

In the embodiment described above, the spectral camera 30 which performs image correction on the display apparatus 11 which emits image light and the calibration apparatus 40 which calibrates the spectral camera 30 are described, but the embodiment is not limited thereto. For example, the calibration system 1 of the spectral camera 30 for performing component analysis of a target object may be used. In this case, the light source portion 10 may be configured to include another light source such as a halogen lamp and the integrating sphere 12 instead of the display apparatus 11.

Modification Example 4

As the light source portion 10, an example in which image light is incident on the integrating sphere 12 from the display apparatus 11 so as to generate uniform light is described, but the embodiment is not limited thereto. For example, light from a light source may be irradiated onto a diffuse reflector which diffusely reflects the light and reflected by the diffuse reflector may be measured by the spectrophotometer 20 and the spectral camera 30.

Modification Example 5

In the embodiment described above, the display apparatus 11 and the spectral camera 30 are separately provided and are communicably coupled to each other by the first communication portion 112 and the second communication portion 34, but the display apparatus 11 and the spectral camera 30 may be integrally provided.

Modification Example 6

Although the calibration apparatus 40 is configured to include the exposure correction portion 434, the imaging control portion 361 of the spectral camera 30 is configured to perform exposure correction on a gradation value of a captured spectrum image and output the spectrum image to the calibration apparatus 40. In this case, the exposure correction portion 434 of the calibration apparatus 40 cannot be required.

Further, when the imaging portion 33 of the spectral camera 30 does not change an exposure time according to the amount of light received, the exposure correction may not be performed.

Modification Example 7

In the embodiment described above, after coordinates of the measurement point Q are transmitted from the display apparatus 11 to the spectral camera 30, the spectral camera 30 captures a spectrum image. On the other hand, after the spectral camera 30 captures a spectrum image, the spectrum image may be transmitted to the display apparatus 11, and the display apparatus 11 may set the measurement point Q based on the received spectrum image. That is, in some cases, the spectral camera 30 and the display apparatus 11 are separately provided and relative positions of the spectral camera 30 and the display apparatus 11 are changed. In this case, in a spectrum image, a projection range of image light projected from the display apparatus 11 may vary. When the display apparatus 11 sets the measurement point Q based on the spectrum image, the measurement point Q can be correctly set even when the projection range of the image light varies in the spectrum image.

Modification Example 8

In the embodiment described above, a correction matrix is stored in the second memory 35 of the spectral camera 30, and the interpolation portion 362 and the color correction portion 363 of the spectral camera 30 calculate a tristimulus value at the measurement points Q instructed from the display apparatus 11.

On the other hand, the correction matrix may be stored in the first memory 113 of the display apparatus 11, and the first processor 114 may function as the interpolation portion 362 or the color correction portion 363. In this case, when a spectrum image is captured, the spectral camera 30 transmits the captured spectrum image to the display apparatus 11. The display apparatus 11 calculates a correction matrix at the measurement point Q by interpolation, and calculates a tristimulus value for the measurement point Q.

Modification Example 9

In the third embodiment described above, the accuracy evaluation portion 438 calculates the evaluation index value V for each learning data and each color variable c. On the other hand, at this time, the evaluation index value for the color variable c calculated from the same learning data is set as a color evaluation index value $V_C$, and a total evaluation index value V may be calculated based on the color evaluation index value $V_C$. For example, the accuracy evaluation portion 438 may use a maximum value among the color evaluation index values $V_C$ calculated for each learning data as the total evaluation index value V, and may use an average value of the color evaluation index values $V_C$ calculated for each learning data as the total evaluation index value V.

Modification Example 10

In the third embodiment described above, the accuracy evaluation portion 438 adopts the correction matrix M(i, j) corresponding to a minimum value of the newly calculated evaluation index value V when YES is determined in step S14.

On the other hand, when YES is determined in step S14, it may be determined whether or not a value obtained by subtracting the minimum value of the newly calculated evaluation index value V from the minimum value of the previous evaluation index value $V_{past}$ is a positive value. In this case, when the value obtained by subtracting the minimum value of the newly calculated evaluation index value V from the minimum value of the previous evaluation index value $V_{past}$ is a positive value, the correction matrix M(i, j) corresponding to the minimum value of the newly calculated evaluation index value V is adopted. Further, when the value obtained by subtracting the minimum value of the newly calculated evaluation index value V from the minimum value of the previous evaluation index value $V_{past}$ is a negative value, the correction matrix M(i, j) corresponding to the minimum value of the previous calculated evaluation index value $V_{past}$ is adopted.

Modification Example 11

In the embodiment described above, the Fabry-Perot etalon illustrated in FIG. 3 is described as the spectral filter 32, but the embodiment is not limited thereto. As the spectral filter 32, other various spectral elements such as AOTF and LCTF can be used.

Modification Example 12

In the third embodiment, in step S13, the accuracy evaluation portion 438 calculates the color difference $\Delta E_{ab}$ in the L*a*b* color space as the color difference $\Delta E(x, y)$, but the embodiment is not limited thereto. For example, the accuracy evaluation portion 438 may calculate the color difference $\Delta E_{00}$ in a color space based on a definition of "CIE DE2000" as the color difference $\Delta E(x, y)$.

Further, the accuracy evaluation portion 438 calculates the evaluation index value V based on the equation (12), but the embodiment is not limited thereto. That is, the evaluation index value may be used by any equation as long as the equation is a function that the evaluation index value decreases as a color difference, the number of target wavelengths, and the number of correction points decrease.

What is claimed is:

1. A calibration apparatus comprising one or a plurality of first processors programmed to:
obtain spectrum images from a spectral camera that images light from a light source portion;
obtain a spectral reference value from a measurement result of a calibration reference device that measures the light;
extract a gradation value at a correction point that is a pixel which generates a correction matrix among the spectrum images as a measurement value;
divide the measurement value at the correction point and the spectral reference value by a luminance value of the light emitted from the light source portion to obtain a normalized measurement value and a normalized reference value; and
calculate the correction matrix based on the normalized measurement value and the normalized reference value.

2. The calibration apparatus according to claim 1, wherein the light source portion includes a display apparatus that outputs image light and an integrating sphere that uniformizes the image light and emits the light.

3. The calibration apparatus according to claim 2, wherein the light source portion causes the display apparatus to output the image light of a plurality of single colors including black and a plurality of low-gradation colors, and
the one or the plurality of first processors are further programmed to:
divide a value obtained by subtracting the measurement value at the correction point for the image light of black from the measurement value at the correction point for the image light of a single color other than the black, by the luminance value of the image light and set the resultant value as the normalized measurement value;
divide a value obtained by subtracting the spectral reference value for the image light of the black from the spectral reference value for the image light of the single color other than the black, by the luminance value of the image light and set the resultant value as the normalized reference value;
divide the measurement value at the correction point for the image light of the black and the plurality of low-gradation colors, by the luminance value of the image light and set the resultant value as a black color normalized measurement value;
divide the spectral reference value for the image light of the black and the low-gradation color, by the luminance value of the image light and set the resultant value as a black color normalized reference value; and
calculate a normal correction matrix based on the normalized measurement value and the normalized reference value, and calculate a black color correction matrix based on the black color normalized measurement value and the black color normalized reference value.

4. The calibration apparatus according to claim 1, wherein the one or the plurality of first processors are further programmed to:
perform exposure correction on the gradation value by dividing the gradation value of the spectrum image by an exposure time when the light is measured by the spectral camera.

5. The calibration apparatus according to claim 1, wherein the one or the plurality of first processors are further programmed to:
evaluate correction accuracy of the calculated correction matrix.

6. The calibration apparatus according to claim 5, wherein the one or the plurality of first processors are further programmed to:
generate a plurality of pieces of learning data in which at least one of a position of the correction point, the number of the correction points, a target wavelength for extracting the measurement value at the correction point, and the number of the target wavelengths is changed;
calculate the correction matrix for each of the plurality of pieces of learning data; and
evaluate the correction matrix for each piece of learning data and adopt the correction matrix having highest evaluation.

7. The calibration apparatus according to claim 6, wherein the one or the plurality of first processors are further programmed to:
generate new learning data by changing at least one of the position of the correction point, the number of the correction points, the target wavelength, and the number of the target wavelengths, of the learning data corresponding to the correction matrix evaluated to have highest evaluation; and
adopt the correction matrix based on the new learning data when an evaluation difference between the correction matrix based on the new learning data and the correction matrix based on the previous learning data is equal to or less than a predetermined threshold value.

8. A method performed by one or a plurality of processors, the method comprising:
obtaining spectrum images from a spectral camera that images light from a light source portion;
obtaining a spectral reference value from a measurement result of a calibration reference device that measures the light;
extracting a gradation value at a correction point that is a pixel which generates a correction matrix among the spectrum images as a measurement value;
dividing the measurement value at the correction point and the spectral reference value by a luminance value of the light emitted from the light source portion to obtain a normalized measurement value and a normalized reference value; and
calculating the correction matrix based on the normalized measurement value and the normalized reference value.

9. A spectral camera comprising:
a memory in which the correction matrix calculated by the calibration apparatus according to claim 1 is recorded; and
one or a plurality of second processors programmed to correct a color at a predetermined position in the spectrum image by using the correction matrix.

10. The spectral camera according to claim 9, wherein the one or the plurality of second processors are further programmed to:
obtain coordinates of a measurement point from a display apparatus and interpolate the correction matrix at the measurement point from the correction matrices for a plurality of the correction points.

11. A display apparatus that is communicably coupled to the spectral camera according to claim 10 and that outputs image light as the light, the apparatus comprising one or a plurality of third processors programmed to:
   transmit a position of a predetermined measurement point in the spectrum image to the spectral camera to command execution of colorimetry; and
   receive a colorimetry result at the measurement point from the spectral camera and correct the image light based on the colorimetry result.

12. A non-transitory computer-readable storage medium storing an instruction for causing one or a plurality of processors to execute a method, the method comprising:
   obtaining spectrum images from a spectral camera that images light from a light source portion;
   obtaining a spectral reference value from a measurement result of a calibration reference device that measures the light;
   extracting a gradation value at a correction point that is a pixel which generates a correction matrix among the spectrum images as a measurement value;
   dividing the measurement value at the correction point and the spectral reference value by a luminance value of the light emitted from the light source portion to obtain a normalized measurement value and a normalized reference value; and
   calculating the correction matrix based on the normalized measurement value and the normalized reference value.

* * * * *